United States Patent [19]

Bedell

[11] Patent Number: 5,019,365

[45] Date of Patent: May 28, 1991

[54] QUATERNARY POLYAMINES AS SULFITE OXIDATION INHIBITORS

[75] Inventor: Stephen A. Bedell, Lake Jackson, Tex.

[73] Assignee: The Dow Chemical Company, Midland, Mich.

[21] Appl. No.: 546,075

[22] Filed: Jun. 29, 1990

Related U.S. Application Data

[63] Continuation-in-part of Ser. No. 277,159, Nov. 29, 1988, abandoned.

[51] Int. Cl.$^5$ .................. C01B 17/00; C01B 17/45; C09K 15/16; C09K 15/22
[52] U.S. Cl. .................. 423/243; 423/242; 423/512 A; 252/401; 252/403
[58] Field of Search .......... 423/244 A, 244 R, 243, 423/242 A, 242 R, 512 A; 252/401, 403

[56] References Cited

U.S. PATENT DOCUMENTS

| | | | |
|---|---|---|---|
| 3,294,827 | 12/1966 | Swanson | 252/401 |
| 3,801,699 | 4/1974 | Arnold | 423/244 |
| 3,873,673 | 3/1975 | Teague et al. | 423/243 |
| 4,310,438 | 1/1982 | Steelhammer | 252/401 |
| 4,324,775 | 4/1982 | Tung | 423/539 |
| 4,342,733 | 8/1982 | Steelhammer | 423/242 |
| 4,363,791 | 12/1982 | Trentham et al. | 423/243 |
| 4,387,037 | 6/1983 | Trentham et al. | 252/184 |
| 4,530,704 | 7/1985 | Jones et al. | 55/48 |
| 4,767,860 | 8/1988 | Dunmore et al. | 544/384 |
| 4,783,327 | 11/1988 | Treybig et al. | 423/243 |
| 4,814,443 | 3/1989 | Treybig et al. | 540/492 |
| 4,814,447 | 3/1989 | Treybig et al. | 544/384 |
| 4,818,506 | 4/1989 | Lin et al. | 423/242 |

OTHER PUBLICATIONS

Vostrcil et al., Commercial Organic Flocculant 1976, p. 1–75.

Huss, et al., J. Amer. Chem.Soc., v. 100, p. 6252 (1978).

*Primary Examiner*—Gregory A. Heller

[57] ABSTRACT

Inhibitors of oxidation of sulfites to sulfates in sulfur dioxide scrubbing solutions are disclosed. The inhibitors are cationic polyelectrolytes which are water soluble, have a molecular weight of at least 10,000 daltons and contain quaternary amine groups. The polyelectrolytes are preferably present at 1–3000 ppm in alkali solutions with which a sulfur dioxide containing gas stream is contacted.

20 Claims, No Drawings

QUATERNARY POLYAMINES AS SULFITE OXIDATION INHIBITORS

CROSS-REFERENCE TO RELATED APPLICATION

This is a continuation-in-part of copending application U.S. Ser. No. 07/277,159, filed Nov. 29, 1988, now abandoned.

Field of the Invention

The present invention relates to alkali scrubbing solutions for sulfur dioxide absorption, and more particularly to such scrubbing solutions containing cationic polyelectrolytes to inhibit oxidation of sulfite to sulfate in the scrubbing solution. The invention also relates to an improvement in a process for removing sulfur dioxide from a gas stream wherein the gas stream containing the sulfur dioxide is contacted with an aqueous alkali solution, and more specifically to the improvement wherein a cationic polyelectrolyte is employed to inhibit oxidation of sulfite to sulfate.

BACKGROUND OF THE INVENTION

From U.S. Patent 4,310,438, it is known to add water-soluble polyethyleneamines having at least one secondary amine and two primary amines to a sulfite-containing aqueous medium for reducing the oxidation of sulfite to sulfate therein. The sulfite-containing medium with the polyethyleneamine additive is thus useful in wet scrubber systems for sulfur dioxide absorption from a gas containing the same.

It is also known from U.S. Pat. No. 4,342,733 to use a topping agent selected from the group consisting of polyphosphate compounds and organophosphonic acid compounds in a scrubbing liquor to supplement and enhance the antioxidant activity of sulfite antioxidant agents such as the linear polyethyleneamines and substituted secondary and tertiary aromatic amines.

One problem with the polyethyleneamine sulfite antioxidants employed in the prior art is that the polyethyleneamines are generally volatile to some extent, particularly the lower molecular weight polyethyleneamines such as triethylenetetramine and tetraethylenepentamine. This results in process losses from the sulfur dioxide scrubbing system and can also pose an odor problem. In addition, such amines can be difficult for waste water treatment systems to tolerate, and therefore, disposal of spent scrubbing solution from systems employing the polyethyleneamines is complicated. For example, the lower molecular weight polyethyleneamines are not retained on ultrafiltration membranes.

Another problem with the polyethyleneamines as additives for sulfite oxidation inhibition is that they readily complex with metals, and it is necessary to add additional quantities of the polyethyleneamines to the scrubbing liquor when metals and other cations are present in the scrubbing liquor. Since the oxidation of sulfite to sulfate is trace-metal catalyzed, and suppressed by metal complexing agents as described in Huss, Jr., et al. J. Amer Chem. Soc., v. 100 p 6252 (1978), an explanation for the anti-oxidant properties of such polyethyleneamines is that they complex with any metal ions which may be present in the scrubbing liquor to inhibit such catalysis, and do not function as true antioxidants.

It is known from U.S. Pat. No. 4,530,704 to use a process for selectively removing and recovering sulfur dioxide for a gas stream containing the same by contacting the gas with absorbent (aqueous piperazine, piperazinone or a morpholinone) and thermally regenerating the absorbent (releasing the sulfur dioxide) for reuse in the contacting step.

It is also known from U.S. Pat. No. 4,783,327 to use a method of removing sulfur dioxide from a gas stream containing the same by absorbing the sulfur dioxide in an aqueous solution containing a 4-(2-hydroxyalkyl)-2-piperazinone compound or alkyl or aryl substituted derivative thereof. These compounds provide an absorbent solution which is less subject to loss during the regeneration step and yet effectively remove the sulfur dioxide from the gas stream without interference from other associated gases.

It is known from U.S. Pat. No. 4,324,775 to use a water-immiscible organic solution of a hydrophobic primary, secondary, tertiary or quaternary amine salt as a sulfite transfer agent for contacting an $SO_2$-pregnant aqueous alkali $SO_2$ scrubbing solution to enhance $SO_2$ scrubbing. The organic solution is subsequently heated to release $SO_2$ in a stripping step, and then recontacted with the aqueous alkali scrubbing solution to regenerate the aqueous solution for recycle to the scrubbing step wherein gaseous $SO_2$ is contacted with the regenerated aqueous alkali $SO_2$ scrubbing solution.

Other sulfur dioxide absorption solvents, buffers and methods are described in various references, such as, for example, U.S. Pat. Nos. 4,387,037; 4,363,791; and 3,873,673.

SUMMARY OF THE INVENTION

The present invention resides in the discovery that quaternary polyamine electrolytes serve as oxidation inhibitors in sulfite solutions. Since these additives are polymeric in nature, they are less volatile than the lower molecular weight polyethyleneamines, and hence, less likely to be lost from the scrubbing liquor through evaporation, and the use thereof in alkali scrubbing systems substantially avoids the odor problems associated with the polyethyleneamines. The polymeric electrolytes of the present invention are widely used as government-approved flocculating agents for water treatment systems, and thus do not complicate disposal of the spent scrubbing liquor. The antioxidant additives of the present invention can also be recovered, if desired, by the use of ultrafiltration membranes since the high molecular weight additives of the present invention are retained thereby A further advantage is that the quaternary polyamine electrolytes of the present invention will not complex metal ions, and can thus be used in the presence of metal ions without substantially affecting the effectiveness thereof as sulfite oxidation inhibitors.

Broadly, the present invention provides an aqueous sulfur dioxide scrubbing solution comprising an aqueous alkali solution suitable for scrubbing gaseous sulfur dioxide. The solution contains sulfite and a cationic polyelectrolyte in an amount effective to inhibit oxidation of the sulfite to sulfate, wherein the polyelectrolyte is a water soluble polymer containing quaternary amine groups.

In another aspect of the invention, there is provided, in a process for removing sulfur dioxide from a gas stream wherein the gas stream containing the sulfur dioxide is contacted with an aqueous alkali solution, the improvement wherein the alkali solution contains an effective amount of a cationic polyelectrolyte to inhibit oxidation of sulfites to sulfates, and wherein the polyelectrolyte is a water soluble polymer containing quaternary amine groups.

DETAILED DESCRIPTION OF THE INVENTION

The present invention is generally applicable to any sulfite-containing aqueous gas scrubbing medium, and also to alkali solutions used to prepare such a medium. For example, the sulfite oxidation inhibitor of the present invention may be used in sulfite solutions per se which are used to scrub sulfur dioxide gases, as well as in alkali or caustic solutions which are used for this purpose, such as, for example, caustic soda, potash, ammonium hydroxide, lime, limestone, amines and the like.

Amine-based aqueous sulfur dioxide scrubbing solutions are a preferred embodiment of the present invention. Sulfur dioxide scrubbing with aqueous amines, such as piperazinone and morpholinone compounds, is well known in the art, and is described, for example, in U. S. Pat. Nos. 4,530,704 to Jones et al. and 4,783,327 to Treybig et al., both of which are incorporated herein by reference. Piperazinone and morpholinone compounds are particularly preferred amines. Suitable piperazinone/morpholinone compounds have the general formula:

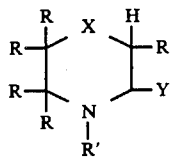

wherein X is oxygen or >NR"; Y is H₂ or oxygen; R is hydrogen, an alkyl group having one to six carbon atoms or aryl or aralkyl group having from six to twelve carbon atoms; R' is hydrogen, an alkyl or hydroxyalkyl group having from one to six carbon atoms, or an aryl or aralkyl group having from six to twelve carbon atoms; and R" is R', or preferably a 2-hydroxyethyl group of the formula:

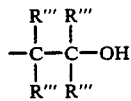

wherein R''' is hydrogen or an alkyl group having one or two carbon atoms. Suitable 4-(2-hydroxyalkyl)-2-piperazinones includes 4-(2-hydroxyethyl)-2-piperazinone, 4-(2-hydroxyethyl)-1-methyl-2-piperazinone, 4-2(2-hydroxyethyl)-3-methyl-2-piperazinone, 4-(2-hydroxyethyl)-5-methyl-2-piperazinone, 3-ethyl-4-(2-hydroxyethyl)-2-piperazinone, 3-ethyl-4-(2-hydroxyethyl)-2-piperazinone, 6-ethyl-4-(2-hydroxyethyl)-2-piperazinone, 4-(2-hydroxyethyl)-5,6-dimethyl-2-piperazinone, 1-ethyl-4-(2-hydroxyethyl)-2-piperazinone, 4-(2-hydroxyethyl)-3-phenyl-2-piperazinone, 1,4-bis(2-hydroxyethyl)-2-piperazinone, 4-(2-hydroxyethyl)-2-piperazinone, 4-(2-hydroxypropyl)-2piperazinone, 4-(2-hydroxybutyl)-2-piperazinone and 4-(2-hydroxypropyl)-6-methyl-2-piperazinone.

The scrubbing amines are generally employed in sulfur dioxide scrubbing solutions at a concentration of from about 0.1 molar up to their saturation concentration in water.

The polyelectrolyte-containing alkali solution is introduced directly to the sulfur dioxide scrubbing system at start-up and/or is added as a makeup to replenish alkali losses, but in either case, it is not necessary in this embodiment to add the polyelectrolyte separately.

The polyelectrolytes of the present invention are water-soluble polymeric quaternary amines. By "water-soluble" it is meant that the polyelectrolytes are soluble or dispersible in the alkali and/or sulfite solution at an effective concentration. The polyelectrolytes preferably have a molecular weight sufficiently high so that it is non-volatile, and especially at least about 10,000 daltons. On the other hand, the molecular weight should not be so high that the polyelectrolyte is not soluble or dispersible in solution. Representative polyelectrolytes include, for example:

(a) N-(3-chloro-2-hydroxypropyl) pyridinium chloride, N-(3-chloro-2-hydroxypropyl)-2,6-dimethylpyridinium chloride, N-(3-chloro-2-hydroxypropyl)-2,4,6-trimethylpyridinium chloride, N-(3-chloro-2-hydroxypropyl)-2-methylpyridinium chloride and the like;

(b) the reaction product of starch and chlorohydroxypropyl trimethyl ammonium salt;

(c) the reaction product of starch and glycidyl trimethylammonium chloride;

(d) propyltrimethylammonium halide;

(e) (1,3-dihydroxypropyl)triethylammonium chloride;

(f) copolymers of acrylamide and quaternary ammonium compounds such as copoly[acrylimide-diallylmethyl(β-propionmamido) ammonium halide], copoly[acrylamide-(β-methacryloyloxyethyl) trimethylammonium methyl sulfate], copoly[acrylamide-diallyl(β-carbamoethyl)ammonium chloride], acrylamidopropylbenzyldimethylammonium hydroxide and the like;

(g) poly(diallyldimethylammonium chloride);

(h) quaternized vinyllactam-acrylamide co-polymers, such as the reaction product obtained by treating acrylamide-vinyllactam copolymer with formaldehyde and dimethylamine in the presence of methyl chloride or phenyl methylene chloride and the like;

(i) polyvinylbenzyltrimethyl ammonium chloride;

(j) poly[diallylmethyl(cyanoethyl) ammoniummethyl sulfate], poly[diallylmethyl-(2-methyloxycarbamoylethyl) ammonium methyl sulfate], poly[diallyl(β-hydroxyethyl)(2-carbamoylethyl) ammonium chloride], poly[dialkylmethyl(β-propionamido) ammonium chloride], poly[N(dimethylaminomethyl)]-acrylamide, poly(2-vinylimidazolinium bisulfate), poly(N-dimethylaminopropyl)methacrylamide and the like.

The aforementioned cationic polymers used in the invention are well known and are available under various tradenames See, for example, J. Vostrcil, et al., Commercial Organic Flocculants (Noyes Data Corp. 1972) which is incorporated by reference herein. Other useful polyelectrolytes are set forth in *J. Macromol. Science—Chem.* A4, pp 1327–1417 (1970) which is also incorporated by reference herein.

The polyelectrolytes are employed in amounts which are effective to inhibit the rate of oxidation of sulfite therein. It is contemplated that effective ranges of the polyelectrolyte are from about 1 ppm to about 3000 ppm, preferably from about 5 to about 500 ppm and especially from about 10 to about 300 ppm. While amounts higher than this may be employed if desired, there is generally no advantage to be obtained by employing excessive amounts of the polyelectrolyte and it is generally uneconomical. On the other hand, if amounts substantially less than this are employed, there may not be sufficient polyelectrolyte to effect a substantial reduction in the sulfite oxidation rate.

The alkali solution containing the polyelectrolyte is advantageously employed in sulfur dioxide scrubbing systems which are well known in the art. Typically, the scrubbing solution is intimately contacted with a sulfur dioxide-containing fluid stream at appropriate conditions, e.g. a pH of 4–10 and a temperature of 0°–95° C. The sulfur dioxide is absorbed into the scrubbing solution, generally as sulfite and bisulfite. The sulfites-containing solution is then typically regenerated for reuse in the scrubbing system, used as a sulfite source for another process, and/or disposed of, or the like. Particulars of the operation of sulfur dioxide scrubbing systems, especially with respect to the preferred piperazinone/morpholinone amine scrubbing agents, are set forth in the above mentioned U.S. Pat. Nos. 4,530,704 and 4,783,327. The inhibition of the oxidation of the sulfites with the polyelectrolyte according to the present invention is usually desirable to minimize alkali consumption, to facilitate pH control, to minimize precipitation and scale formation and for other various reasons, depending on the particulars of the selected scrubbing system.

EXAMPLE

Sodium sulfite (1.26 g) and sodium bisulfite (1.04 g) were diluted to 100 ml total volume with OMNISOL brand ultrapure water and sufficient AGEFLOC WT-40 (40% poly(diallyldimethylammonium chloride)) to obtain 40 ppm of poly(DADMAC). Air was sparged into the solution at a rate of 425 cc per minute. At periodic time intervals a 1.0 ml aliquot was removed and analyzed by iodine titration for total sulfites (including bisulfite). The following results were obtained:

| TIME ELASPED (HOURS:MINUTES:SECONDS) | SULFITES CONCENTRATION (MOLES/LITER) | PERCENT OF INITIAL SULFITES |
|---|---|---|
| 0:00:18 | 0.198 | 99 |
| 0:02:25 | 0.189 | 94 |
| 0:12:18 | 0.154 | 77 |
| 0:27:02 | 0.100 | 50 |
| 0:41:30 | 0.098 | 49 |
| 2:05:00 | 0.044 | 22 |

COMPARATIVE EXAMPLE

The foregoing example was repeated, except that no AGEFLOC WT-40 or other polyelectrolyte was added to the solution. The results are as follows:

| TIME ELASPED (HOURS:MINUTES:SECONDS) | SULFITES CONCENTRATION (MOLES/LITER) | PERCENT OF INITIAL SULFITES |
|---|---|---|
| 00:18 | 0.175 | 88 |
| 02:45 | 0.172 | 86 |
| 09:30 | 0.109 | 55 |
| 17:40 | 0.078 | 39 |
| 29:30 | 0.073 | 37 |
| 46:50 | 0.055 | 28 |

The foregoing examples illustrate the effectiveness of the polyelectrolytes of the present invention in stabilizing sulfite solutions against oxidation.

The foregoing description of the invention is illustrative and explanatory thereof, and various modifications will become apparent to those skilled in the art in view thereof. It is intended that all such modifications which fall within the scope and spirit of the appended claims be embraced thereby.

I claim:

1. In a process for scrubbing sulfur dioxide from a gas stream comprising the step of contacting the gas stream with an aqueous alkali solution to form sulfites therein, the improvement wherein:
   the alkali solution contains an effective amount of a cationic polyelectrolyte to inhibit oxidation of the sulfites to sulfates, said polyelectrolyte being a water soluble polymer containing quaternary amine groups.

2. The improvement of claim 1, wherein the alkali solution contains caustic soda, potash, lime, limestone or amine scrubbing agent in an amount effective to scrub sulfur dioxide from said gas stream.

3. The improvement of claim 1, wherein said polyelectrolyte has a molecular weight of at least about 10,000 daltons.

4. The improvement of claim 1, wherein the polyelectrolyte concentration is from about 1 to about 3000 ppm in the alkali solution.

5. The improvement of claim 3, wherein the polyelectrolyte concentration is from about 5 to about 500 ppm in the alkali solution.

6. The improvement of claim 3, wherein the polyelectrolyte concentration is from about 10 to about 300 ppm in the alkali solution.

7. The improvement of claim 3, wherein said polyelectrolyte is selected from N-(3-chloro-2-hydroxypropyl) pyridinium chloride, N-(3-chloro-2-hydroxypropyl)-2,6-dimethylpyridinium chloride, N-(3-chloro-2-hydroxypropyl)-2,4,6-trimethylpyridinium chloride, and N-(3-chloro-2-hydroxypropyl)-2-methylpyridinium chloride.

8. The improvement of claim 3, wherein said polyelectrolyte comprises the reaction product of starch and chlorohydroxypropyl trimethyl ammonium salt.

9. The improvement of claim 3, wherein said polyelectrolyte comprises the reaction product of starch and glycidyl trimethylammonium chloride.

10. The improvement of claim 3, wherein said polyelectrolyte comprises propyltrimethylammonium halide.

11. The improvement of claim 3, wherein said polyelectrolyte comprises (1,3-dihydroxypropyl)triethylammonium chloride.

12. The improvement of claim 3, wherein said polyelectrolyte is selected from copolymers of acrylamide and quaternary ammonium compounds.

13. The improvement of claim 3, wherein the polyelectrolyte comprises poly(diallyldimethylammonium chloride).

14. The improvement of claim 3, wherein the polyelectrolyte is selected from quaternized vinyllactamacrylamide copolymers.

15. The improvement of claim 3, wherein the polyelectrolyte comprises polyvinylbenzyltrimethyl ammonium chloride.

16. The improvement of claim 3, wherein the polyelectrolyte is selected from poly[diallylmethyl(cyanoethyl) ammonium methyl sulfate], poly[diallylmethyl-(2-methyloxycarbamoylethyl) ammonium methyl sulfate], poly[diallyl($\beta$-hydroxyethyl)(2-carbamoylethyl) ammonium chloride], poly[dialkylmethyl($\beta$-propionamido) ammonium chloride], poly[N-(dimethylaminomethyl)]acrylamide, poly(2-vinylimidazolinium bisulfate), and poly(N-dimethylaminopropyl)-methacrylamide.

17. The improvement of claim 1, wherein the polyelectrolyte is recovered from the alkali solution by an ultrafiltration membrane.

18. The improvement of claim 1, wherein the alkali solution contains at least about 0.1 molar of a piperazinone or morpholinone compound of the formula:

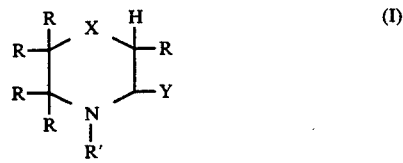

wherein X is oxygen or >NR'', Y is $H_2$ or oxygen, R is hydrogen, an alkyl group having one to six carbon atoms or aryl or aralkyl group having from six to twelve carbon atoms, R' is hydrogen, an alkyl or hydroxyalkyl group having from one to six carbon atoms, or an aryl or aralkyl group having from six to twelve carbon atoms, and R'' is R' or a 2-hydroxyethyl group of the formula:

wherein R''' is hydrogen or an alkyl group having one or two carbon atoms.

19. The improvement of claim 1, wherein the alkali solution contains a piperazinone selected from the group consisting of 4-(2-hydroxyethyl)-2-piperazinone, 4-(2-hydroxyethyl)-1-methyl-2-piperazinone, 4-(2-hydroxyethyl)-3-methyl-2-piperazinone, 4-(2-hydroxyethyl)-5-methyl-2-piperazinone, 3-ethyl-4-(2-hydroxyethyl)-2-piperazinone, 3-ethyl-4-(2-hydroxyethyl)-2-piperazinone, 6-ethyl-4-(2-hydroxyethyl)-2-piperazinone, 1-ethyl-4-(2-hydroxyethyl)-2-piperazinone, 4-(2-hydroxyethyl)-3-phenyl-2-piperazinone, 1,4-bis(2-hydroxyethyl)-2-piperazinone, 4-(2-hydroxyethyl)-2-piperazinone, 4-(2-hydroxypropyl)-2-piperazinone, 4-(2-hydroxybutyl)-2-piperazinone and 4-(2-hydroxypropyl)-6-methyl-2-piperazinone.

20. The improvement of claim 19, wherein said piperazinone is present in said alkali solution at a concentration of at least about 0.1 molar.

* * * * *

UNITED STATES PATENT AND TRADEMARK OFFICE
CERTIFICATE OF CORRECTION

PATENT NO. : 5,019,365

DATED : May 28, 1991

INVENTOR(S) : Stephen A. Bedell

It is certified that error appears in the above-identified patent and that said Letters Patent is hereby corrected as shown below:

Title Page, Line 16, change "J. Amer. Chem. Soc., v. 100" to --J. Amer. Chem. Soc., V. 108--.

Col. 8, line 33, change "none, 1-" to --none, 4-(2-hydroxyethyl) -5,6-dimethyl - 2 piperazainone, 1- --.

Signed and Sealed this

First Day of June, 1993

MICHAEL K. KIRK

*Attest:*

*Attesting Officer*     *Acting Commissioner of Patents and Trademarks*